US 11,519,290 B2

(12) United States Patent
Kato et al.

(10) Patent No.: US 11,519,290 B2
(45) Date of Patent: Dec. 6, 2022

(54) SPRING WASHER FOR A VARIABLE FLOW RATE VALVE MECHANISM

(71) Applicant: IHI Corporation, Tokyo (JP)

(72) Inventors: Takehiko Kato, Tokyo (JP); Jinhee Byon, Tokyo (JP)

(*) Notice: Subject to any disclaimer, the term of this patent is extended or adjusted under 35 U.S.C. 154(b) by 79 days.

(21) Appl. No.: 17/065,519

(22) Filed: Oct. 8, 2020

(65) Prior Publication Data

US 2021/0033001 A1    Feb. 4, 2021

Related U.S. Application Data

(63) Continuation-in-part of application No. PCT/JP2019/000533, filed on Jan. 10, 2019.

(30) Foreign Application Priority Data

Apr. 13, 2018 (JP) .............................. JP2018-077430

(51) Int. Cl.
*F01D 17/10* (2006.01)
*F16B 39/24* (2006.01)
(Continued)

(52) U.S. Cl.
CPC .......... *F01D 17/105* (2013.01); *F02B 37/186* (2013.01); *F16B 39/24* (2013.01);
(Continued)

(58) Field of Classification Search
CPC ...... F01D 17/105; F16B 39/24; F16B 43/002; F16B 39/26; F16K 1/523; F05D 2230/54;
(Continued)

(56) References Cited

U.S. PATENT DOCUMENTS 4,559,969 A * 12/1985 Ulming ................... H01G 9/12
                                                137/540
5,415,202 A *  5/1995 Shiffler .................. F16K 47/08
                                                137/625.33
(Continued)

FOREIGN PATENT DOCUMENTS

CN    108884751    11/2018
JP    S59-113510   7/1984
(Continued)

OTHER PUBLICATIONS

International Preliminary Report on Patentability with Written Opinion dated Oct. 22, 2020 for PCT/JP2019/000533.
(Continued)

*Primary Examiner* — John Bastianelli
(74) *Attorney, Agent, or Firm* — Soei Patent & Law Firm

(57) ABSTRACT

A variable flow rate valve mechanism includes a valve, a lock member, a valve attachment member and a spring washer. The valve includes a valve body and a valve shaft. The lock member is fixed to the valve shaft. The valve attachment member is attached to the valve shaft. The spring washer is disposed adjacent the valve attachment member. The spring washer is formed into an annular shape around an axis of the spring washer. The spring washer includes a support portion, a deformable portion and a protrusion portion. The support portion includes a seat surface and an open surface. The deformable portion is connected to the support portion and extends in an inclined manner. The deformable portion includes a contact surface and an opposite surface. The protrusion portion protrudes from at least one of the open surface of the support portion and the opposite surface of the deformable portion.

20 Claims, 10 Drawing Sheets

(51) Int. Cl.
*F16B 43/00* (2006.01)
*F16K 1/52* (2006.01)
*F16B 39/26* (2006.01)
*F02B 37/18* (2006.01)
*F16F 1/32* (2006.01)

(52) U.S. Cl.
CPC ............ *F16B 39/26* (2013.01); *F16B 43/002* (2013.01); *F16F 1/32* (2013.01); *F16K 1/523* (2013.01); *F05D 2220/40* (2013.01); *Y02T 10/12* (2013.01)

(58) Field of Classification Search
CPC ............ F05D 2230/64; F05D 2260/38; F05D 2220/40; F02B 37/186; Y02T 10/12; F16F 1/32
USPC .......................................... 251/233, 284, 337
See application file for complete search history.

(56) References Cited

U.S. PATENT DOCUMENTS

| | | | | |
|---|---|---|---|---|
| 7,644,583 B2* | 1/2010 | Leavesley | ............. | F02B 37/183 60/602 |
| 9,080,504 B2* | 7/2015 | Doehler | ................ | F02B 37/183 |
| 2005/0151310 A1* | 7/2005 | Rodeffer | ................... | F16F 1/32 267/161 |
| 2012/0055154 A1* | 3/2012 | Ebert | .................... | F01D 17/105 60/602 |
| 2012/0317975 A1* | 12/2012 | Schoenherr | ........... | F02B 37/183 60/602 |
| 2014/0345273 A1* | 11/2014 | Yamaguchi | ........... | F02B 37/186 60/602 |
| 2015/0377119 A1* | 12/2015 | Niedens | ................ | F02B 37/186 74/579 E |
| 2019/0010864 A1 | 1/2019 | Hoffmann | | |
| 2019/0195270 A1* | 6/2019 | Lee | ......................... | F16B 39/26 |

FOREIGN PATENT DOCUMENTS

| | | |
|---|---|---|
| JP | S64-006440 | 1/1989 |
| JP | 2013-253676 | 12/2013 |
| JP | 2014-101958 | 6/2014 |
| JP | 2014-218945 | 11/2014 |
| JP | 2015-166621 | 9/2015 |
| JP | 2015-197068 | 11/2015 |
| JP | 2016-205252 | 12/2016 |
| JP | 2018-031310 | 3/2018 |
| WO | 2017/157769 | 9/2017 |

OTHER PUBLICATIONS

International Search Report dated Mar. 12, 2019 for PCT/JP2019/000533.

* cited by examiner

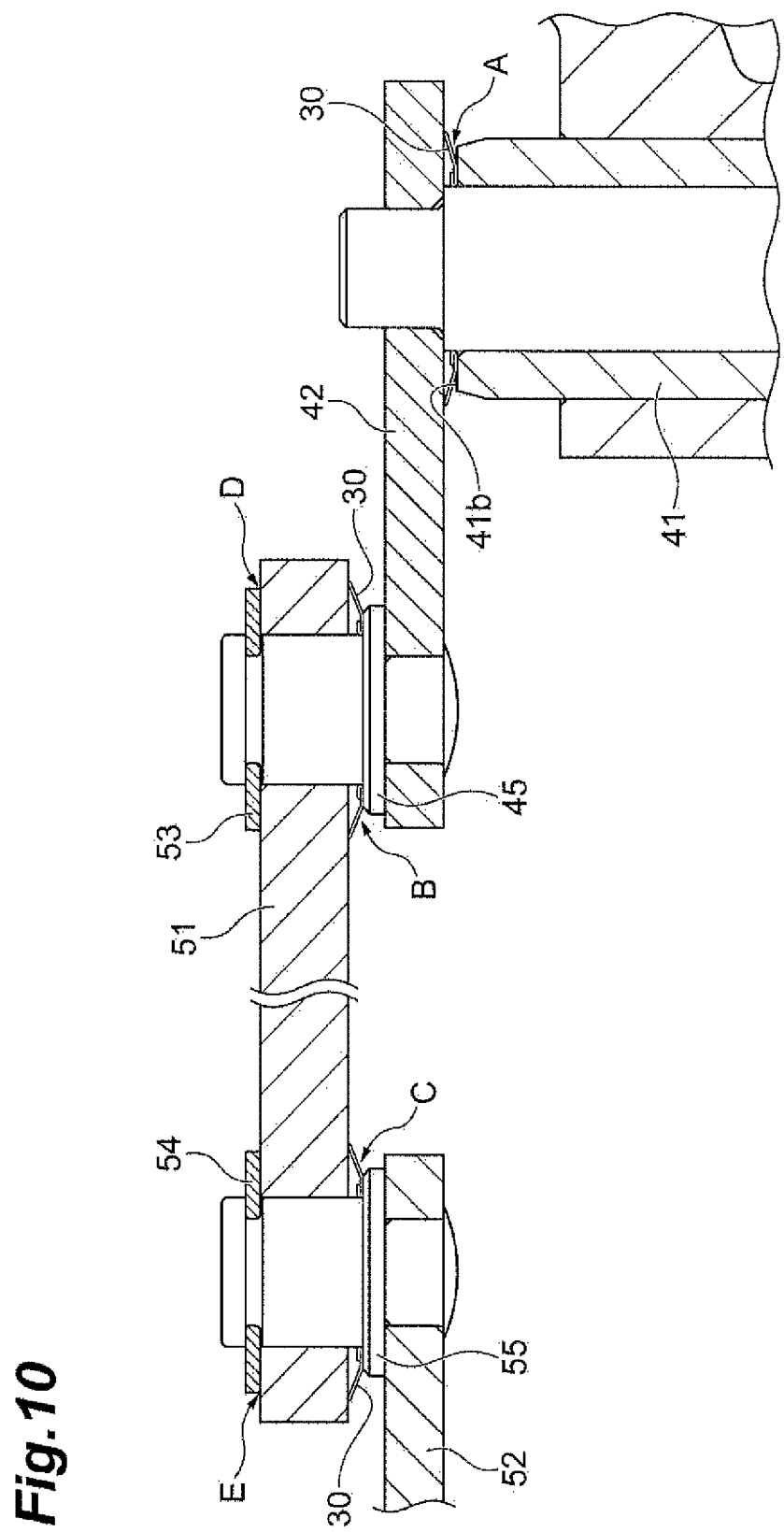

SPRING WASHER FOR A VARIABLE FLOW RATE VALVE MECHANISM

CROSS-REFERENCE TO RELATED APPLICATIONS

This application is a continuation-in-part application of PCT Application No. PCT/JP2019/000533, filed on Jan. 10, 2019, which claims the benefit of priority from Japanese Patent Application No. 2018-077430, filed on Apr. 13, 2018, the entire contents of which are incorporated herein by reference.

BACKGROUND

Japanese Unexamined Patent Publication No. 2015-197068 describes a spring washer which includes a support portion and a deformable portion and in which the support portion and the deformable portion are integrally feinted to intersect each other. When such a spring washer is pressed to cause the deformable portion and the support portion to approach each other in a parallel state, due to the deformation of the deformable portion, the spring washer generates a repulsive force to repel the pressing. The spring washer functions as a spring owing to such a repulsive force.

SUMMARY

An example spring washer for a variable flow rate valve mechanism disclosed herein is formed into an annular shape around an axis of the spring washer. The washer includes a support portion, a deformable portion and a protrusion portion. The support portion includes a seat surface formed along a plane perpendicular to the axis of the spring washer and an open surface opposite to the seat surface. The deformable portion is connected to the support portion and extends in an inclined manner with respect to the plane. The deformable portion includes a contact surface formed to be continuous with the open surface of the support portion and an opposite surface formed to be continuous with the seat surface of the support portion. The protrusion portion protrudes from at least one of the open surface of the support portion and the opposite surface of the deformable portion. The protrusion portion is configured to limit a deformation of the deformable portion during actuation of the spring washer.

BRIEF DESCRIPTION OF THE DRAWINGS

FIG. 10 is a cross-sectional view of the variable flow rate valve mechanism of FIG. 9.

DETAILED DESCRIPTION

Figure 1:
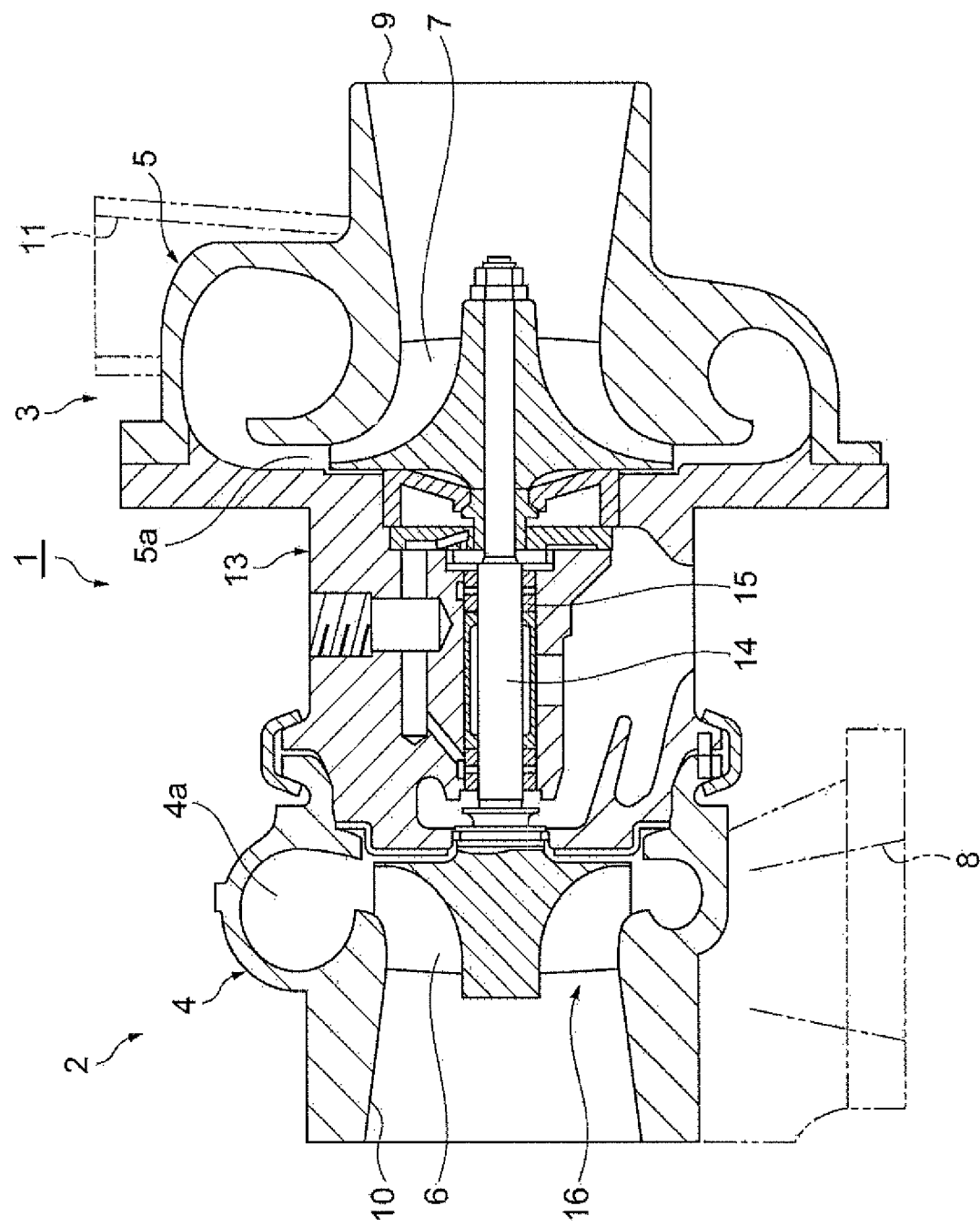
FIG. 1 is a cross-sectional view illustrating an example turbocharger to which an example variable flow rate valve mechanism is applied.

An example spring washer for a variable flow rate valve mechanism disclosed herein is formed into an annular shape around an axis of the spring washer. The washer includes a support portion, a deformable portion and a protrusion portion. The support portion includes a seat surface formed along a plane perpendicular to the axis of the spring washer and an open surface opposite to the seat surface. The deformable portion is connected to the support portion and extends in an inclined manner with respect to the plane. The deformable portion includes a contact surface formed to be continuous with the open surface of the support portion and an opposite surface formed to be continuous with the seat surface of the support portion. The protrusion portion protrudes from at least one of the open surface of the support portion and the opposite surface of the deformable portion. The protrusion portion is configured to limit a deformation of the deformable portion during actuation of the spring washer.

In the spring washer, the support portion includes the seat surface formed along the plane perpendicular to the axis of the spring washer, and the open surface provided opposite to the seat surface. The deformable portion is connected to the support portion and extends in an inclined manner with respect to the plane. For example, the spring washer is disposed between two components in an axial direction along the axis. When both components approach each other along the axial direction, the deformable portion is deformed to approach the plane (surface with which the seat surface is in contact) and to generate a repulsive force. Here, the protrusion portion protrudes from at least one of the open surface of the support portion and the opposite surface of the deformable portion. The protrusion portion is configured to limit a deformation of the deformable portion during actuation of the spring washer. For this reason, one of the components comes into contact with the protrusion portion before the deformable portion reaches the plane. Accordingly, an excessive deformation of the deformable portion is inhibited, and a plastic deformation of the spring washer is inhibited to improve the reliability.

In some examples, the support portion is formed into an annular shape around the axis of the spring washer. The deformable portion is connected to the radial end portion of the support portion. The protrusion portion is provided on the open surface of the support portion. In this case, since the support portion is formed into an annular shape around the axis of the spring washer, when the spring washer is disposed, for example, such that the seat surface is in contact with one component, the stability of the spring washer is improved.

The deformable portion may be connected to a radial outer end portion of the support portion. Additionally, the protrusion portion may be formed by bending a radial inner edge of the support portion.

In other examples, the deformable portion may be connected to a radial inner end portion of the support portion. Furthermore, the protrusion portion may be formed by bending a radial outer edge of the support portion.

In some examples, the support portion includes a plurality of first support portions and a plurality of second support portions. Each of the first support portions includes a first seat surface formed along a first plane perpendicular to the axis of the spring washer and a first open surface opposite to the first seat surface. Each of the second support portions includes a second seat surface and a second open surface opposite to the second seat surface. The second seat surface is formed along a second plane perpendicular to the axis of the spring washer and is spaced apart from the first plane in a direction along the axis of the spring washer. The first support portions and the second support portions are spaced apart from each other in a circumferential direction of the spring washer and are alternately disposed in the circumferential direction. The deformable portion includes a plurality of inclined portions. Each of the inclined portions is connected to a circumferential end portion of the first support portion and a circumferential end portion of the second support portion to extend in an inclined manner with respect to the first plane and the second plane. The protrusion portion is provided on at least one of the first open surface of the first support portion and the second open surface of the second support portion. In this case, for example, the spring washer is disposed between two components in the axial direction along the axis of the spring washer. When both components approach each other along the axial direction, the first seat surface and the second seat surface approach each other, and the inclined portion is deformed to generate a repulsive force. Here, the protrusion portion is provided on at least one of the first open surface of the first support portion and the second open surface of the second support portion. For this reason, one of the components comes into contact with the protrusion portion before the inclined portion reaches the first plane or the second plane. Accordingly, an excessive deformation of the inclined portion is inhibited to improve the reliability.

An example variable flow rate valve mechanism includes a valve, a lock member, a valve attachment member and the spring washer. The valve includes a valve body and a valve shaft protruding from the valve body. The lock member is fixed to the valve shaft. The valve attachment member is attached to the valve shaft between the valve body and the lock member to hold the valve together with the lock member. The spring washer may be disposed between the valve attachment member and the lock member or between the valve attachment member and the valve body to apply a repulsive force to the valve attachment member and the valve. In this case, when the valve attachment member and the lock member or the valve attachment member and the valve body approach each other, the deformable portion of the spring washer is deformed to generate a repulsive force. Here, any one of the valve attachment member, the lock member, and the valve body comes into contact with the protrusion portion before the deformable portion reaches a plane along the seat surface. Accordingly, an excessive deformation of the deformable portion is inhibited, and a plastic deformation of the spring washer is inhibited to improve the reliability.

An example variable flow rate valve mechanism disclosed herein includes a valve, a stem, a bearing, a link member and the spring washer. The stem has a first end and a second end. The first end is coupled to the valve. The bearing has a tubular shape and rotatably supports the stem. The link member is coupled to the second end of the stem. The second end of the stem protrudes from an end face of the bearing. The spring washer is disposed between the end face of the bearing and the link member. In this case, the spring force of the spring washer is capable of inhibiting collision between the bearing and the link member. Accordingly, collision noise (striking noise) between the bearing and the link member in the variable flow rate valve mechanism is reduced to reduce noise generated from a turbocharger and to improve the reliability of the turbocharger.

An example variable flow rate valve mechanism includes a valve, a stem, a link member, an operation rod and the spring washer. The stem has a first end and a second end. The first end is coupled to the valve. The link member has a base end portion and a tip portion. The base end portion is coupled to a second end of the stem. The operation rod is coupled to the tip portion of the link member. The spring washer may be disposed between the link member and the operation rod. In this case, the spring force of the spring washer is capable of inhibiting collision between the link member and the operation rod. Accordingly, collision noise (striking noise) between the link member and the operation rod in the variable flow rate valve mechanism is reduced to reduce noise generated from the turbocharger and to improve the reliability of the turbocharger.

An example variable flow rate valve mechanism includes a valve, a stem, a first link member, an operation rod, a second link member and the spring washer. The stem has a first end and a second end. The first end is coupled to the valve. The first link member has a base end portion and a tip portion. The base end portion is coupled to the second end of the stem. The operation rod is coupled to the tip portion of the first link member. The second link member is coupled to the base end portion of the operation rod. The spring washer may be disposed between the operation rod and the second link member. In this case, the spring force of the spring washer is capable of inhibiting collision between the operation rod and the second link member. Accordingly, collision noise (striking noise) between the operation rod and the second link member in the variable flow rate valve mechanism is reduced to reduce noise generated from the turbocharger and to improve the reliability of the turbocharger.

Accordingly, the example turbochargers disclosed herein, including a variable flow rate valve mechanism, may be configured to exhibit some or all of the foregoing effects to improve the reliability.

Hereinafter, with reference to the drawings, the same elements or similar elements having the same function are denoted by the same reference numerals, and redundant description will be omitted.

Figure 2:
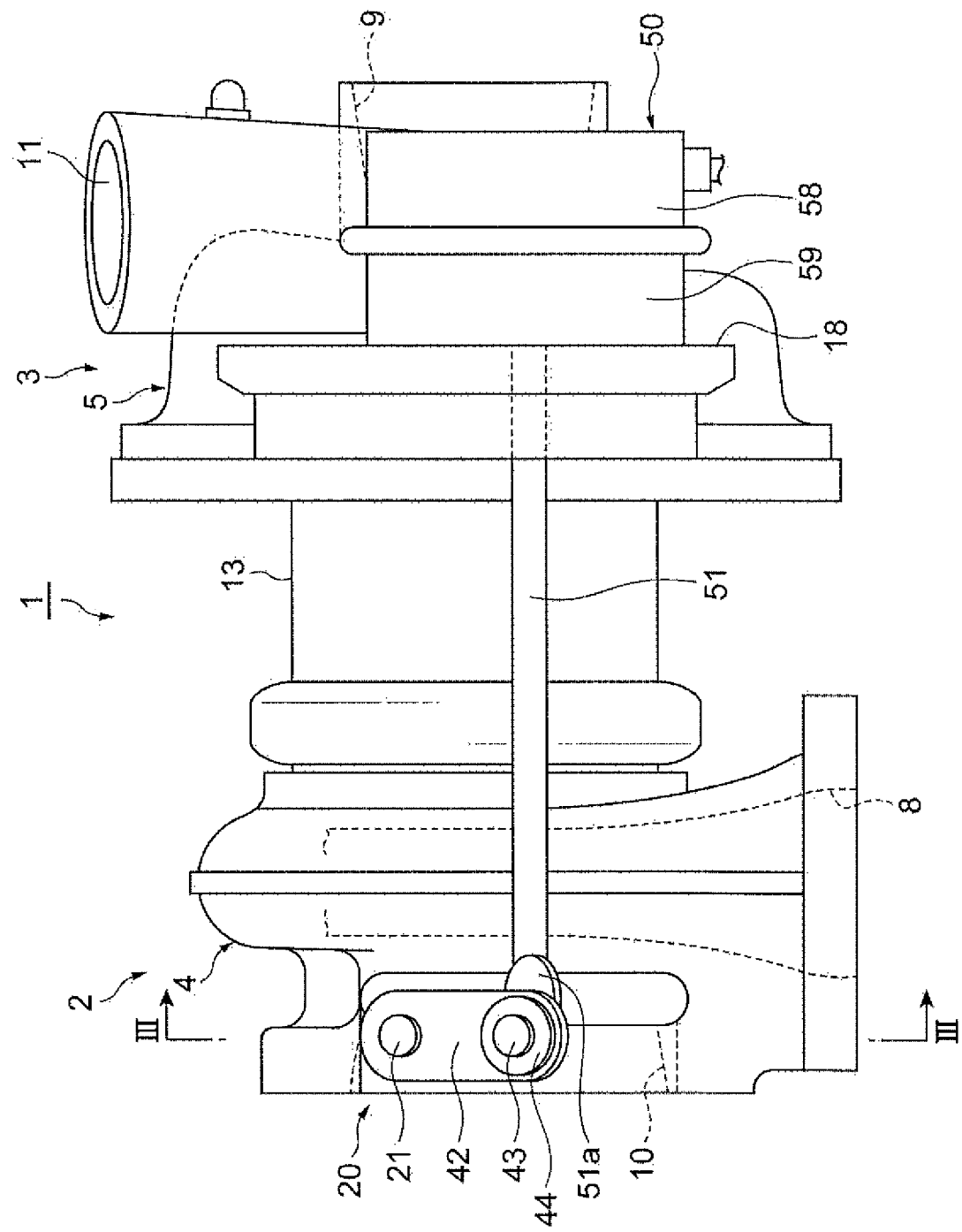
FIG. 2 is a side view of the example turbocharger of FIG. 1.
Figure 3:
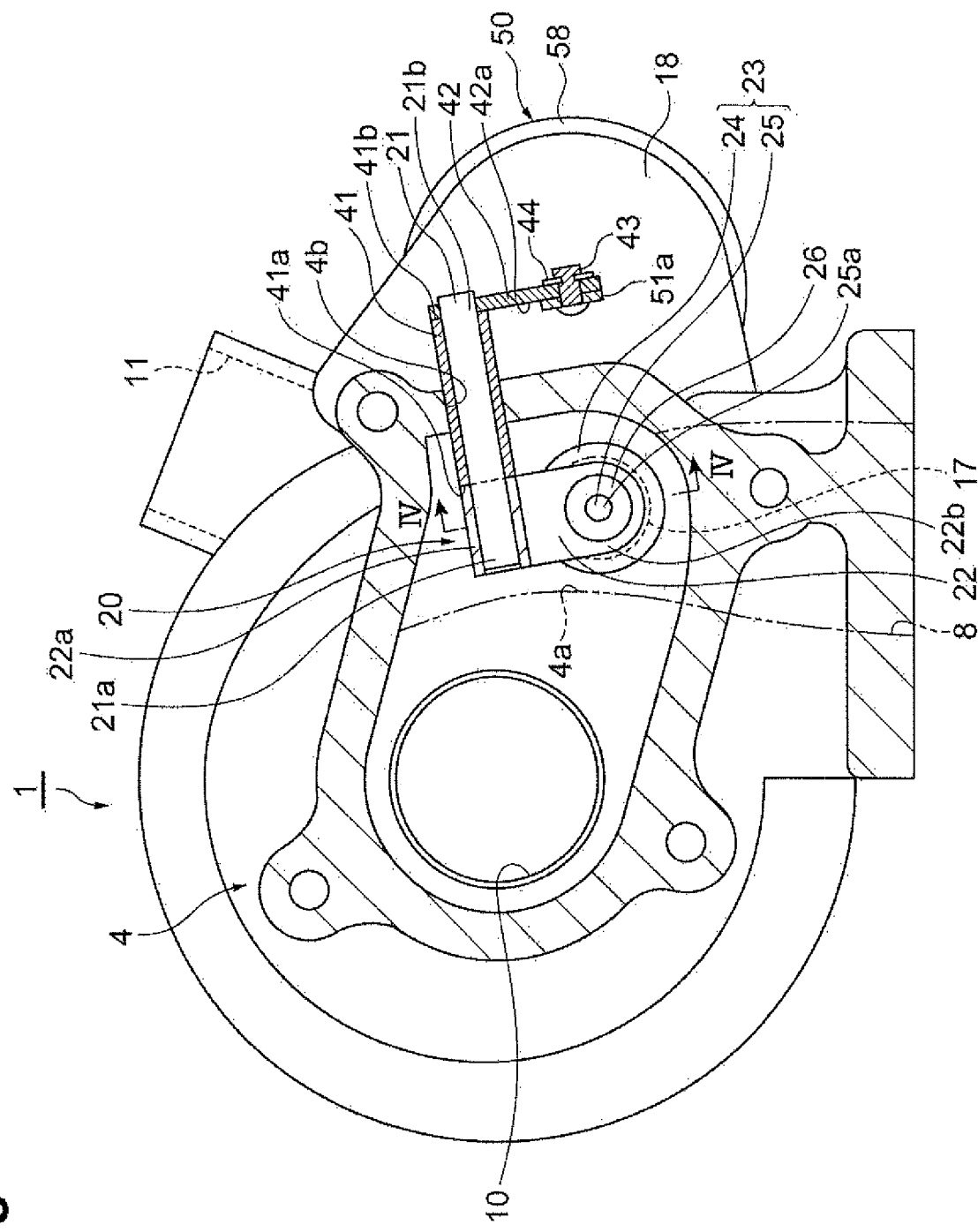
FIG. 3 is a cross-sectional view taken along a line through the example turbocharger of FIG. 2.

An example turbocharger 1 illustrated in FIGS. 1 to 3 is, for example, a turbocharger for a vehicle, and uses exhaust gas exhausted from an engine to compress air to be supplied to the engine. As illustrated in FIG. 1, the turbocharger 1 includes a turbine 2 and a compressor 3. The turbine 2 includes a turbine housing 4 and a turbine impeller 6 accommodated in the turbine housing 4. The compressor 3 includes a compressor housing 5 and a compressor impeller 7 accommodated in the compressor housing 5.

The turbine impeller 6 is provided at a first end of a rotary shaft 14, and the compressor impeller 7 is provided at a second end of the rotary shaft 14. A bearing housing 13 is provided between the turbine housing 4 and the compressor housing 5. The rotary shaft 14 is rotatably supported via a bearing 15 on the bearing housing 13. The turbocharger 1 includes a turbine rotor shaft 16. The turbine rotor shaft 16 includes the rotary shaft 14 and the turbine impeller 6. The turbine rotor shaft 16 and the compressor impeller 7 rotate as an integral rotating body.

The turbine housing 4 is provided with an exhaust gas inlet port 8 and an exhaust gas outlet port 10. The exhaust gas exhausted from the engine flows into a turbine scroll flow path 4a through the exhaust gas inlet port 8 to rotate the turbine impeller 6 and thereafter, flows outside the turbine housing 4 through the exhaust gas outlet port 10.

The compressor housing 5 is provided with an intake port 9 and a discharge port 11. As described above, when the turbine impeller 6 rotates, the turbine rotor shaft 16 and the compressor impeller 7 rotate. The compressor impeller 7 rotates to compress air which is taken in from the intake port 9. The compressed air passes through a compressor scroll flow path 5a to be discharged from the discharge port 11. The compressed air discharged from the discharge port 11 is supplied to the engine.

A bypass passage 17 (refer to FIG. 3) through which a part of the exhaust gas introduced from the exhaust gas inlet port 8 bypasses the turbine impeller 6 to be delivered to an exhaust gas outlet port 10 is formed inside the turbine housing 4. The bypass passage 17 is a variable gas flow rate passage that varies the flow rate of the exhaust gas to be supplied to a turbine impeller 6.

As illustrated in FIGS. 2 and 3, the turbocharger 1 includes a wastegate valve 20 (one example of a variable flow rate valve mechanism) provided inside the turbine housing 4. The wastegate valve 20 is configured to open and close an opening portion of the bypass passage 17. The wastegate valve 20 includes a stem 21 that is supported to be rotatable with respect to an exterior wall of the turbine housing 4, a valve attachment member 22 that projects out from a first end 21a of the stem 21 in a radial direction of the stem 21, a valve 23 that is held by a tip portion 22b of the valve attachment member 22, a lock plate (lock member) 26 that is fixed to one end of the valve 23 to hold the valve 23 together with the valve attachment member 22, and a spring washer 30 (refer to FIG. 4) that is disposed between the valve attachment member 22 and the lock plate 26. The wastegate valve 20 further includes a bearing 41 that rotatably supports the stem 21, a link member (first link member) 42 that is coupled to the stem 21, an operation rod 51 that is coupled to the link member 42, and a link member 52 (second link member, refer to FIGS. 9 and 10) that is coupled to the operation rod 51.

A support hole (through-hole) 4b which penetrates through the exterior wall in a thickness direction thereof is formed in the exterior wall of the turbine housing 4. The bearing 41 having a cylindrical shape is inserted through the support hole 4b. The bearing 41 is fixed with respect to the exterior wall of the turbine housing 4. The bearing 41 may have a diameter that is constant from a first end side to a second end side in an axial direction. In some examples, a first end face 41a of the bearing 41, which is positioned inside the turbine housing 4, is formed flat and a second end face 41b of the bearing 41, which is positioned outside the turbine housing 4, is also formed flat. The bearing 41 may include a small-diameter portion that is formed on the first end side inside the turbine housing 4, and a large-diameter portion that is formed on the second end side outside the turbine housing 4. The bearing 41 may include an inclined portion of which the diameter increases from the first end side toward the second end side.

The stem 21 is inserted through the bearing 41 and is supported to be rotatable with respect to the exterior wall of the turbine housing 4. The first end 21a of the stem 21, which is disposed inside the turbine housing 4, is inserted through a tubular portion which is formed in a base end portion 22a of the valve attachment member 22. The base end portion 22a of the valve attachment member 22 is joined to the first end 21a of the stem 21 by welding or the like. An end face on a bearing 41 side of the tubular portion formed in the base end portion 22a of the valve attachment member 22 is parallel to the first end face 41a of the bearing 41 and faces the first end face 41a. The stem 21 rotates around an axis of the stem 21 to oscillate the valve attachment member 22. The tip portion 22b of the valve attachment member 22 is provided with an attachment hole 22c (refer to FIG. 4) into which the valve 23 is attached.

A base end portion of the link member 42, which has a plate shape and protrudes in the radial direction of the stem 21, is fixed (coupled) to a second end 21b of the stem 21, which is disposed outside the turbine housing 4 and protrudes from the second end face 41b of the bearing 41 which is opposite to the valve 23. The second end 21b of the stem 21 penetrates through a through-hole formed in the link member 42. A back surface 42a of the link member 42 is parallel to the second end face 41b of the bearing 41, and faces the second end face 41b.

The operation rod 51 is coupled to a tip portion of the link member 42. For example, an attachment hole through which a coupling pin 43 is inserted is formed in the tip portion of the link member 42, and the coupling pin 43 is inserted through the attachment hole. In addition, the coupling pin 43 is inserted through an attachment hole formed in a tip portion 51a of the operation rod 51. A first end portion of the coupling pin 43 is fixed to the operation rod 51 by caulking. A clip 44 is mounted in a second end portion of the coupling pin 43 to prevent the coupling pin 43 from falling out from the attachment hole. The tip portion 51a of the operation rod 51 and the coupling pin 43 are rotatable with respect to the link member 42. As the operation rod 51 moves, the tip portion of the link member 42 oscillates around the axis of the stem 21. In some examples, the stem 21 is coupled to the operation rod 51 via the link member 42 and the coupling pin 43.

A base end portion of the operation rod 51, which is opposite to the link member 42, is coupled to the link member 52. For example, an attachment hole through which a coupling pin is inserted is formed in a tip portion of the link member 52, and the coupling pin is inserted through the attachment hole. In addition, the coupling pin is inserted through an attachment hole formed in the base end portion of the operation rod 51. A first end portion of the coupling pin is fixed to the operation rod 51 by caulking. A clip is mounted in a second end portion of the coupling pin to prevent the coupling pin from falling out from the attachment hole. The base end portion of the operation rod 51 and the coupling pin are rotatable with respect to the link member 52.

An actuator 50 is fixed to a bracket 18 that protrudes sideways from the compressor housing 5. For example, the actuator 50 includes a diaphragm that drives the operation rod 51, a low-pressure chamber 59 and a high-pressure chamber 58 that are adjacent to each other to interpose the diaphragm therebetween in an axial direction of the operation rod 51, and a return spring that is disposed in the low-pressure chamber 59 to bias the diaphragm. When an outlet side pressure of the compressor 3 reaches a set pressure, the actuator 50 moves the operation rod 51 toward a tip side, and when the outlet side pressure of the compressor 3 is less than the set pressure, the actuator 50 moves the operation rod 51 toward a base end side.

Figure 4:
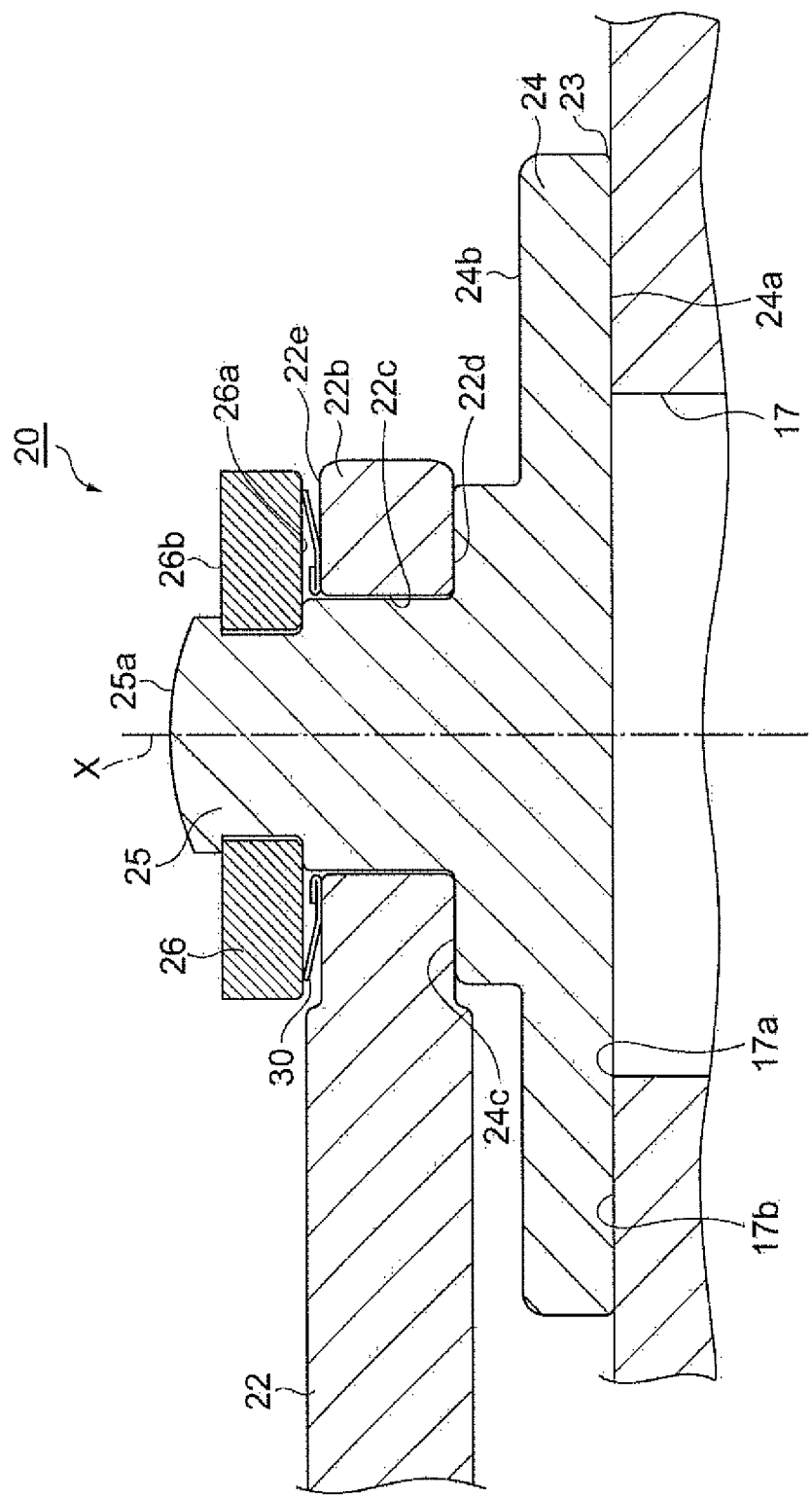
FIG. 4 is a cross-sectional view taken along a line IV-IV through the example turbocharger of FIG. 3.

Subsequently, the wastegate valve 20 will be described in detail. As illustrated in FIGS. 3 and 4, the valve 23 is capable of coming into contact with and separating from a peripheral edge portion 17b of an opening portion 17a of the bypass passage 17. The peripheral edge portion 17b is a surface of a member in which the bypass passage 17 is formed. The valve 23 includes a valve body 24 and a valve shaft 25 that protrudes from the valve body 24. The valve body 24 has, for example, a disk shape. The valve body 24 includes a sealing surface 24a that faces the peripheral edge portion 17b, a back surface 24b that is opposite to the sealing surface 24a, and a support surface 24c that protrudes from the back surface 24b. The valve shaft 25 protrudes from a side of the valve body 24, which is opposite to the bypass passage 17. The valve shaft 25 protrudes from the support surface 24c of the valve body 24. The valve shaft 25 has, for example, a columnar shape. For example, the valve shaft 25 is formed integrally with the valve body 24.

The valve shaft 25 is inserted through the attachment hole 22c of the valve attachment member 22. The valve attachment member 22 includes a first attachment surface 22d facing the valve body 24, and a second attachment surface 22e opposite to the first attachment surface 22d. The first attachment surface 22d of the valve attachment member 22 is in contact with the support surface 24c of the valve body 24.

The lock plate 26 is fixed to an end portion 25a of the valve shaft 25, which is opposite to the valve body 24. The lock plate 26 is fixed to the valve shaft 25 by, for example, caulking. The lock plate 26 is fixed to the valve shaft 25 such that the valve attachment member 22 is disposed between the valve body 24 and the lock plate 26. The lock plate 26 includes a first lock surface 26a facing the valve attachment member 22, and a second lock surface 26b opposite to the first lock surface 26a.

The outer diameter of the valve shaft 25 is smaller than the inner diameter of the attachment hole 22c. The distance between the first lock surface 26a of the lock plate 26 and the support surface 24c of the valve body 24 is larger than the thickness of the valve attachment member 22. For example, a gap is provided between the first lock surface 26a of the lock plate 26 and the second attachment surface 22e of the valve attachment member 22. As described above, the valve attachment member 22 is attached to the valve shaft 25 between the valve body 24 and the lock plate 26 to hold the valve 23 together with the lock plate 26. Accordingly, the valve 23 is coupled to the first end 21a of the stem 21 via the valve attachment member 22 and the lock plate 26.

Figure 5A:
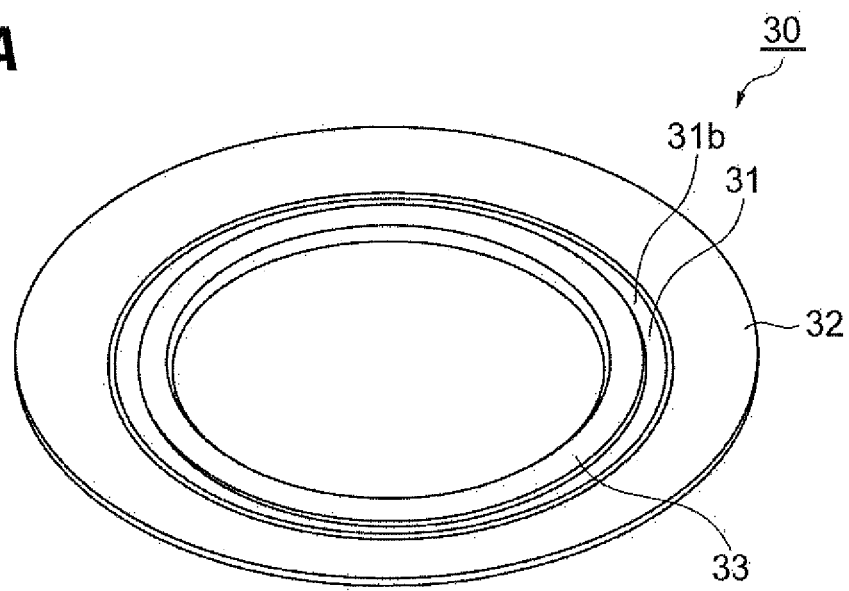
FIGS. 5A and 5B are perspective views of an example spring washer of FIG. 4.
Figure 5B:
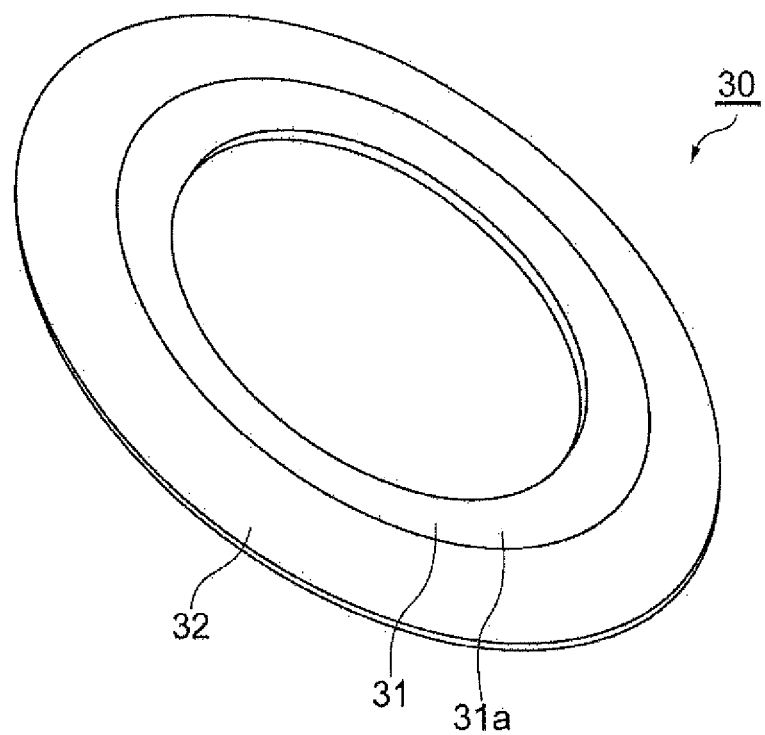
Figure 6:
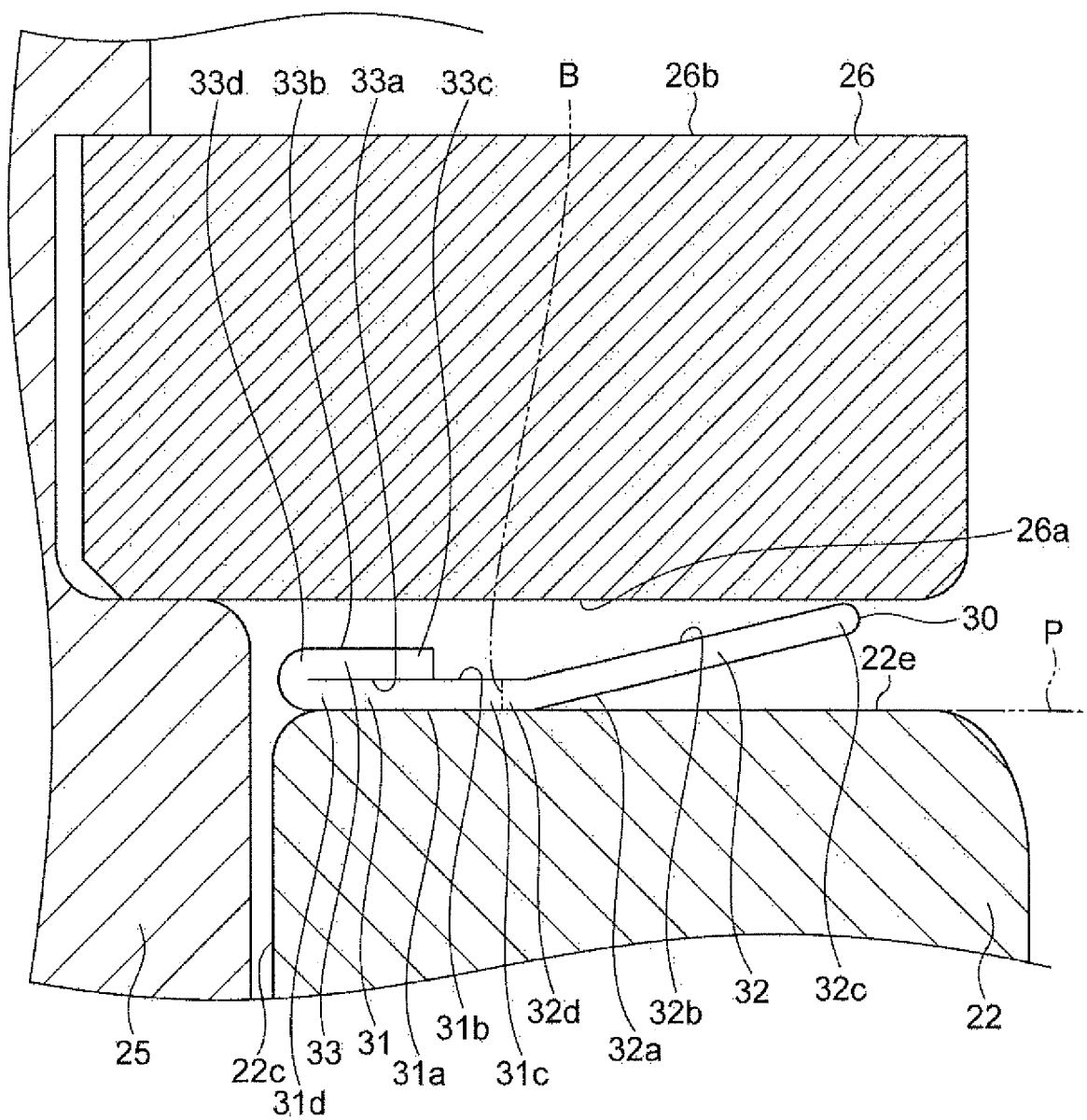
FIG. 6 is a partial enlarged view of FIG. 4.

The spring washer 30 is disposed between the valve attachment member 22 and the lock plate 26 to apply a repulsive force (elastic force) to the valve attachment member 22 and the valve 23. As illustrated in FIGS. 5A, 5B and 6, the spring washer 30 is a so-called quarter-bead coned disk spring. The spring washer 30 is formed into an annular shape around an axis X (refer to FIG. 4). The spring washer 30 includes a support portion 31 that is formed into an annular shape, and a deformable portion (elastic deformable portion) 32 that is connected to a radial end portion of the support portion 31.

The support portion 31 is formed into an annular shape around the axis X. The support portion 31 includes a seat surface 31a that is formed along a plane P perpendicular to the axis X, and an open surface 31b that is opposite to the seat surface 31a. The support portion 31 includes a radial outer end portion 31c and a radial inner end portion 31d.

The deformable portion 32 is formed into an annular shape around the axis X. The deformable portion 32 includes a first surface (opposite surface) 32a and a second surface (contact surface) 32b that is opposite to the first surface 32a. The deformable portion 32 includes a radial outer end portion 32c and a radial inner end portion 32d. The deformable portion 32 is formed integrally with the support portion 31 by connecting the inner end portion 32d to the outer end portion 31c of the support portion 31. In FIG. 6, an example of the boundary between the support portion 31 and the deformable portion 32 is indicated by a virtual line B.

The deformable portion 32 extends and is inclined with respect to the plane P. The deformable portion 32 extends outward in a radial direction from the outer end portion 31c of the support portion 31 and along the plane P, and then is bent toward an open surface 31b side. Accordingly, the deformable portion 32 includes a bent portion. The first surface 32a of the deformable portion 32 is formed to be continuous with the seat surface 31a of the support portion 31. The second surface 32b of the deformable portion 32 is formed to be continuous with the open surface 31b of the support portion 31. The thickness of the deformable portion 32 is the same as the thickness of the support portion 31. The stress-strain curve (load-deflection characteristic curve) of the deformable portion 32 may be nonlinear. The deformable portion 32 may be a linear elastic body following Hooke's law.

The spring washer 30 further includes a protrusion portion 33 that is provided in the support portion 31 to protrude in a thickness direction of the support portion 31. The protrusion portion 33 is provided on the open surface 31b of the support portion 31. The protrusion portion 33 is formed into an annular shape around the axis X. The protrusion portion 33 includes a third surface 33a facing the support portion 31, and a fourth surface 33b opposite to the third surface 33a. The protrusion portion 33 includes a radial outer end portion 33c and a radial inner end portion 33d. The protrusion portion 33 is formed integrally with the support portion 31 by connecting the inner end portion 33d to the inner end portion 31d of the support portion 31. The protrusion portion 33 is formed, for example, by bending a radial inner edge of the support portion 31 by 180°.

The third surface 33a of the protrusion portion 33 is formed to be continuous with the open surface 31b of the support portion 31. The third surface 33a of the protrusion portion 33 is in contact with the open surface 31b of the support portion 31. The fourth surface 33b of the protrusion portion 33 is formed to be continuous with the seat surface 31a of the support portion 31. The thickness of the protrusion portion 33 is the same as the thickness of the support portion 31.

As described above, the spring washer 30 is integrally formed from one sheet of annular member having a uniform thickness. The thickness of a region of the spring washer 30 in which the protrusion portion 33 is provided is two times the thickness of the support portion 31, the deformable portion 32, or the protrusion portion 33. The outer end portion 32c of the deformable portion 32 is positioned opposite to the support portion 31 with respect to the protrusion portion 33. The outer end portion 32c of the deformable portion 32 protrudes further than the fourth surface 33b of the protrusion portion 33. The length of the deformable portion 32 in an axial direction along the axis X (distance from the seat surface 31a of the support portion 31 to the outer end portion 32c of the deformable portion 32 in the axial direction) is larger than the total of the thickness of the support portion 31 and the thickness of the protrusion portion 33. The length of the deformable portion 32 in the axial direction in a free state before setting is larger than the maximum distance between the second attachment surface 22e of the valve attachment member 22 and the first lock surface 26a of the lock plate 26.

The material of the spring washer 30 is, for example, a metal having elasticity. The material of the spring washer 30 is, for example, INCONEL (Registered Trademark) 718. The spring washer 30 is disposed such that the seat surface 31a of the support portion 31 is in contact with the second attachment surface 22e of the valve attachment member 22 and the outer end portion 32c of the deformable portion 32 is in contact with the first lock surface 26a of the lock plate 26. The spring washer 30 applies a repulsive force to the valve attachment member 22 and the lock plate 26. FIG. 6 illustrates an example state where the spring washer 30 is pressed to a set position to be disposed between the valve attachment member 22 and the lock plate 26. Accordingly, when the spring washer 30 is at the set position, the deformable portion 32 has moved closer to the plane P than in the free state.

The wastegate valve 20 having the above configuration is opened and closed by the operation of the actuator 50. When due to the operation of the actuator 50, the valve attachment member 22 oscillates to cause the valve 23 to come into contact with the peripheral edge portion 17b of the opening portion 17a of the bypass passage 17, the wastegate valve 20 enters a closed state. When the valve attachment member 22 oscillates to cause the valve 23 to separate from the peripheral edge portion 17b of the opening portion 17a of the bypass passage 17, the wastegate valve 20 enters an open state.

When the wastegate valve 20 is in a closed state, the valve attachment member 22 may be inclined with respect to the peripheral edge portion 17b. When the wastegate valve 20 is in a closed state, the sealing surface 24a of the valve body 24 may be inclined with respect to the peripheral edge portion 17b, so that the bypass passage 17 is not completely sealed. Accordingly, the outer diameter of the valve shaft 25 is set to be smaller than the inner diameter of the attachment hole 22c of the valve attachment member 22, and the distance between the first lock surface 26a of the lock plate 26 and the support surface 24c of the valve body 24 is set to be larger than the thickness of the valve attachment member 22. In some examples, the valve 23 is supported to be movable (including tilting) by a very small amount with respect to the valve attachment member 22.

Accordingly, when the valve 23 moves by a very small amount with respect to the valve attachment member 22 in a state where the wastegate valve 20 is slightly open, the valve 23 comes into contact with the valve attachment member 22 or the peripheral edge portion 17b of the opening portion 17a of the bypass passage 17 to cause abnormal noise. Since the spring washer 30 is provided between the valve attachment member 22 and the lock plate 26, a very small amount of movement of the valve 23 with respect to the valve attachment member 22 is inhibited. As a result, the occurrence of abnormal noise due to the valve 23 corning into contact with the valve attachment member 22 or the peripheral edge portion 17b of the opening portion 17a of the bypass passage 17 is inhibited.

In addition, since the position of the valve 23 with respect to the valve attachment member 22 can be changed, when the wastegate valve 20 is in a closed state and the valve attachment member 22 is inclined with respect to the peripheral edge portion 17b, the sealing surface 24a of the valve body 24 is allowed to move in a direction where the sealing surface 24a becomes parallel to the peripheral edge portion 17b. When the sealing surface 24a of the valve body 24 moves in the direction where the sealing surface 24a becomes parallel to the peripheral edge portion 17b, the position of the lock plate 26 with respect to the valve attachment member 22 may be changed, and the second attachment surface 22e of the valve attachment member 22 and the first lock surface 26a of the lock plate 26 may approach each other. In this case, the spring washer 30 is deformed to cause the deformable portion 32 to approach the plane P; and thereby, a repulsive force is applied to the valve 23 via the lock plate 26 and the valve body 24 is allowed to move in a direction where the sealing surface 24a comes into close contact with the peripheral edge portion 17b. Additionally, the elasticity of the spring washer 30 can be set to be large enough not to prevent the valve 23 from moving by a very small amount with respect to the valve attachment member 22 when the valve body 24 moves in the direction where the sealing surface 24a comes into close contact with the peripheral edge portion 17b.

As described above, in the spring washer 30, the support portion 31 includes the seat surface 31a that is formed along a plane P perpendicular to the axis X, and the open surface 31b that is opposite to the seat surface 31a. The deformable portion 32 is connected to the radial end portion of the support portion 31 to extend in an inclined manner with respect to the plane P. The spring washer 30 is disposed between the valve attachment member 22 and the lock plate 26 in the axial direction along the axis X. When the valve attachment member 22 and the lock plate 26 approach each other in the axial direction, the deformable portion 32 is deformed to approach the plane P and generate a repulsive force. Here, the protrusion portion 33 is provided in the support portion 31 to protrude in the thickness direction of the support portion 31. For this reason, the lock plate 26 comes into contact with the protrusion portion 33 before the deformable portion 32 reaches the plane P. The spring washer 30 is deformed in an elastic deformation region, and the lock plate 26 comes into contact with the protrusion portion 33 before the spring washer 30 reaches a plastic deformation region. Accordingly, an excessive deformation of the deformable portion 32 is inhibited, and a plastic deformation of the spring washer 30 is inhibited to improve the reliability. Such an effect is particularly remarkable when the turbocharger 1 including the spring washer 30 operates during a hot state. Further, since the third surface 33a of the protrusion portion 33 is in contact with the open surface 31b of the support portion 31, the reliability of the spring washer 30 is further improved. If there is a space between the third surface 33a of the protrusion portion 33 and the open surface 31b of the support portion 31, the protrusion portion 33 may collapse to interfere with the deformable portion 32 when the lock plate 26 comes into contact with the protrusion portion 33. This may lead to the deterioration of the reliability of the spring washer 30.

In the spring washer 30, the support portion 31 is formed into an annular shape around the axis X, the deformable portion 32 is connected to the radial end portion of the support portion 31, and the protrusion portion 33 is provided on the open surface 31b of the support portion 31. According to this configuration, since the support portion 31 is formed into an annular shape around the axis X, when the spring washer 30 is disposed, for example, such that the seat surface 31a is in contact with the second attachment surface 22e of the valve attachment member 22, the stability of the spring washer 30 is improved.

In the example spring washer 30 described above, the deformable portion 32 is connected to the radial outer end portion 31c of the support portion 31 to improve the reliability.

In the spring washer 30, the protrusion portion 33 may be formed by bending the radial inner edge of the support portion 31 to improve the reliability with a simple configuration. Further, a dimension of the support portion 31 is at least 20% larger than a dimension of the protrusion portion 33 in a radial direction of the spring washer 30. Accordingly, the spring washer 30 is stably located between the lock plate 26 and the valve attachment member 22. Also, a tip portion of the protrusion portion 33 does not interfere with the deformable portion 32. As such, the reliability of the spring washer 30 is further improved.

The wastegate valve 20 includes the valve 23 that includes the valve body 24 and the valve shaft 25 protruding from the valve body 24, the lock plate 26 that is fixed to a side of the valve shaft 25, which is opposite to the valve body 24, the valve attachment member 22 that is attached to the valve shaft 25 between the valve body 24 and the lock plate 26 to hold the valve 23 together with the lock plate 26, and the spring washer 30 that is disposed between the valve attachment member 22 and the lock plate 26 to apply a repulsive force to the valve attachment member 22 and the valve 23. When the valve attachment member 22 and the lock plate 26 approach each other, the deformable portion 32 of the spring washer 30 is deformed to generate a repulsive force. Here, the lock plate 26 comes into contact with the protrusion portion 33 before the deformable portion 32 reaches the plane P along the seat surface 31a. Accordingly, an excessive deformation of the deformable portion 32 is inhibited, and a plastic deformation of the spring washer 30 is inhibited to improve the reliability.

The turbocharger 1 may be configured to include the wastegate valve 20 in order to improve the reliability.

Figure 7A:
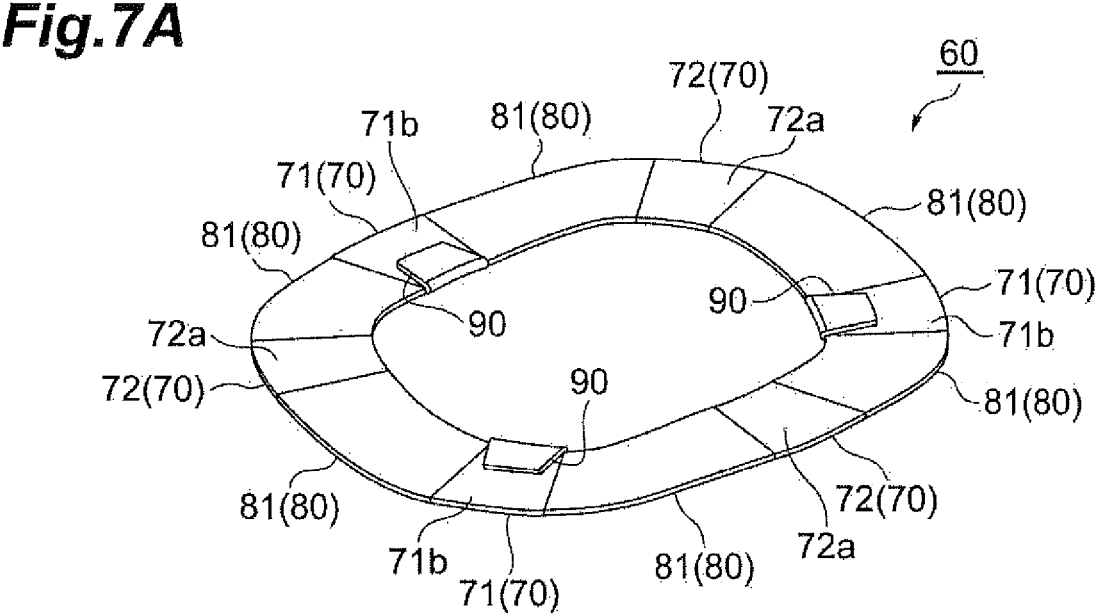
FIGS. 7A and 7B are perspective views of another example spring washer.
Figure 7B:
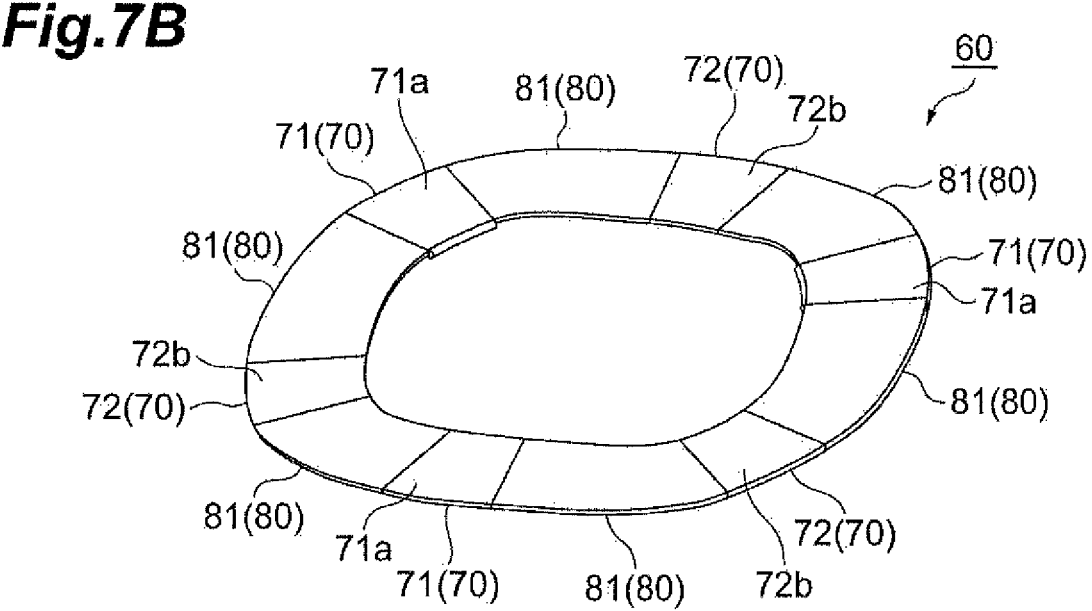

In other examples, the wastegate valve may include a spring washer 60 instead of the spring washer 30. As illustrated in FIGS. 7A and 7B, the spring washer 60 is a so-called wave washer. The spring washer 60 is formed into an annular shape around an axis. The spring washer 60 includes a support portion 70, a deformable portion 80, and a protrusion portion 90.

The support portion 70 includes a plurality of first support portions 71 and a plurality of second support portions 72. The first support portions 71 and the second support portions 72 are spaced apart from each other in a circumferential direction around the axis and are alternately disposed in the circumferential direction. The first support portion 71 includes a first seat surface 71a that is formed along a first plane perpendicular to the axis, and a first open surface 71b that is opposite to the first seat surface 71a. The second support portion 72 includes a second seat surface 72a that is formed along a second plane which is perpendicular to the axis and is spaced apart from the first plane in an axial direction and a second open surface 72b that is opposite to the second seat surface 72a. The first seat surface 71a and the second seat surface 72a are outer side surfaces of the spring washer 60 in the axial direction. The first open surface 71b and the second open surface 72b are inner side surfaces of the spring washer 60 in the axial direction. The thickness of the first support portion 71 is the same as the thickness of the second support portion 72.

The deformable portion 80 includes a plurality of inclined portions 81 of which each is connected to a circumferential end portion of the first support portion 71 and a circumferential end portion of the second support portion 72 to extend in an inclined manner with respect to the first plane and the second plane. The inclined portion 81 is formed integrally with the first support portion 71 and the second support portion 72. The inclined portion 81 is formed between the first seat surface 71a and the second seat surface 72a in the axial direction. One surface of the inclined portion 81 is formed to be continuous with the first seat surface 71a and the second open surface 72b. The other surface of the inclined portion 81 is formed to be continuous with the first open surface 71b and the second seat surface 72a. The thickness of the inclined portion 81 is the same as the thickness of each of the first support portion 71 and the second support portion 72.

The protrusion portion 90 is provided on the first open surface 71b of the first support portion 71. The protrusion portion 90 is connected to an inner end portion of the first support portion 71, and is formed integrally with the first support portion 71. The protrusion portion 90 is formed, for example, by bending an inner edge of the first support portion 71 by 180°. One surface of the protrusion portion 90 is formed to be continuous with the first open surface 71b of the first support portion 71. One surface of the protrusion portion 90 is in contact with the first open surface 71b of the first support portion 71. The other surface of the protrusion portion 90 is formed to be continuous with the first seat surface 71a of the first support portion 71. The thickness of the protrusion portion 90 is the same as the thickness of the first support portion 71.

As described above, the spring washer 60 is integrally formed from one sheet of annular member having a uniform thickness. The thickness of a region of the spring washer 60 in which the protrusion portion 90 is provided is two times the thickness of the first support portion 71, the second support portion 72, the inclined portion 81, or the protrusion portion 90. The distance between the first seat surface 71a and the second seat surface 72a is larger than the combined total thickness including the thickness of the first support portion 71, the thickness of the protrusion portion 90, and the thickness of the second support portion 72. The distance between the first seat surface 71a and the second seat surface 72a in a free state before setting is larger than the maximum distance between the second attachment surface 22e of the valve attachment member 22 and the first lock surface 26a of the lock plate 26.

For example, the spring washer 60 is disposed such that the first seat surface 71a of the first support portion 71 is in contact with the second attachment surface 22e of the valve attachment member 22 and the second seat surface 72a of the second support portion 72 is in contact with the first lock surface 26a of the lock plate 26. When the spring washer 60 is pressed along the axial direction, the deformable portion 80 is deformed to approach the first plane and the second plane, so that the spring washer 60 generates a repulsive force to repel the pressing. When the spring washer 60 is at a set position, the deformable portion 80 has moved closer to the first plane and the second plane than in the free state.

As described above, the valve 23 is supported to be movable by a very small amount with respect to the valve attachment member 22. Similar to the spring washer 30, since the spring washer 60 inhibits a very small amount of movement of the valve 23 with respect to the valve attachment member 22, the occurrence of abnormal noise due to the valve 23 coming into contact with the valve attachment member 22 or the peripheral edge portion 17b of the opening portion 17a of the bypass passage 17 can be inhibited.

In addition, as described above, since the position of the valve 23 with respect to the valve attachment member 22 can be changed, when the wastegate valve 20 is in a closed state and the valve attachment member 22 is inclined with respect to the peripheral edge portion 17b, the sealing surface 24a of the valve body 24 is allowed to move in the direction where the sealing surface 24a becomes parallel to the peripheral edge portion 17b. When the sealing surface 24a of the valve body 24 moves in the direction where the sealing surface 24a becomes parallel to the peripheral edge portion 17b, the position of the lock plate 26 with respect to the valve attachment member 22 may be changed, and the second attachment surface 22e of the valve attachment member 22 and the first lock surface 26a of the lock plate 26 may approach each other. In this case, the spring washer 60 is deformed to cause the deformable portion 80 to approach the first plane and the second plane; and thereby, a repulsive force is applied to the valve 23 via the lock plate 26 and the valve body 24 is allowed to move in the direction where the sealing surface 24a comes into close contact with the peripheral edge portion 17b.

As described above, in the spring washer 60, the support portion 70 includes the plurality of first support portions 71 of which each includes the first seat surface 71a formed along the first plane perpendicular to the axis and the first open surface 71b opposite to the first seat surface 71a, and the plurality of second support portions 72 of which each includes the second seat surface 72a formed along the second plane which is perpendicular to the axis and is spaced apart from the first plane in the axial direction and the second open surface 72b opposite to the second seat surface. The first support portions 71 and the second support portions 72 are spaced apart from each other in the circumferential direction and are alternately disposed in the circumferential direction. The deformable portion 80 includes a plurality of inclined portions 81 of which each is connected to a circumferential end portion of the first support portion 71 and a circumferential end portion of the second support portion 72 to extend in an inclined manner with respect to the first plane and the second plane. The protrusion portion 90 is provided on the first open surface 71b of the first support portion 71. For example, in a case where the spring washer 60 is disposed between the valve attachment member 22 and the lock plate 26, when the valve attachment member 22 and the lock plate 26 approach each other along the axial direction, the first seat surface 71a and the second seat surface 72a approach each other, and the inclined portion 81 is deformed to generate a repulsive force. Here, the protrusion portion 90 is provided on the first open surface 71b of the first support portion 71. For this reason, the lock plate 26 comes into contact with the protrusion portion 90 before the inclined portion 81 reaches the first plane or the second plane. The spring washer 60 is deformed in an elastic deformation region, and the lock plate 26 comes into contact with the protrusion portion 90 before the spring washer 60 reaches a plastic deformation region. Accordingly, an excessive deformation of the inclined portion 81 is inhibited, and a plastic deformation of the spring washer 60 is inhibited to improve the reliability.

It is to be understood that not all aspects, advantages and features described herein may necessarily be achieved by, or included in, any one particular example. Indeed, having described and illustrated various examples herein, it should be apparent that other examples may be modified in arrangement and detail. We claim all modifications and variations coming within the spirit and scope of the subject matter claimed herein.

Figure 8:
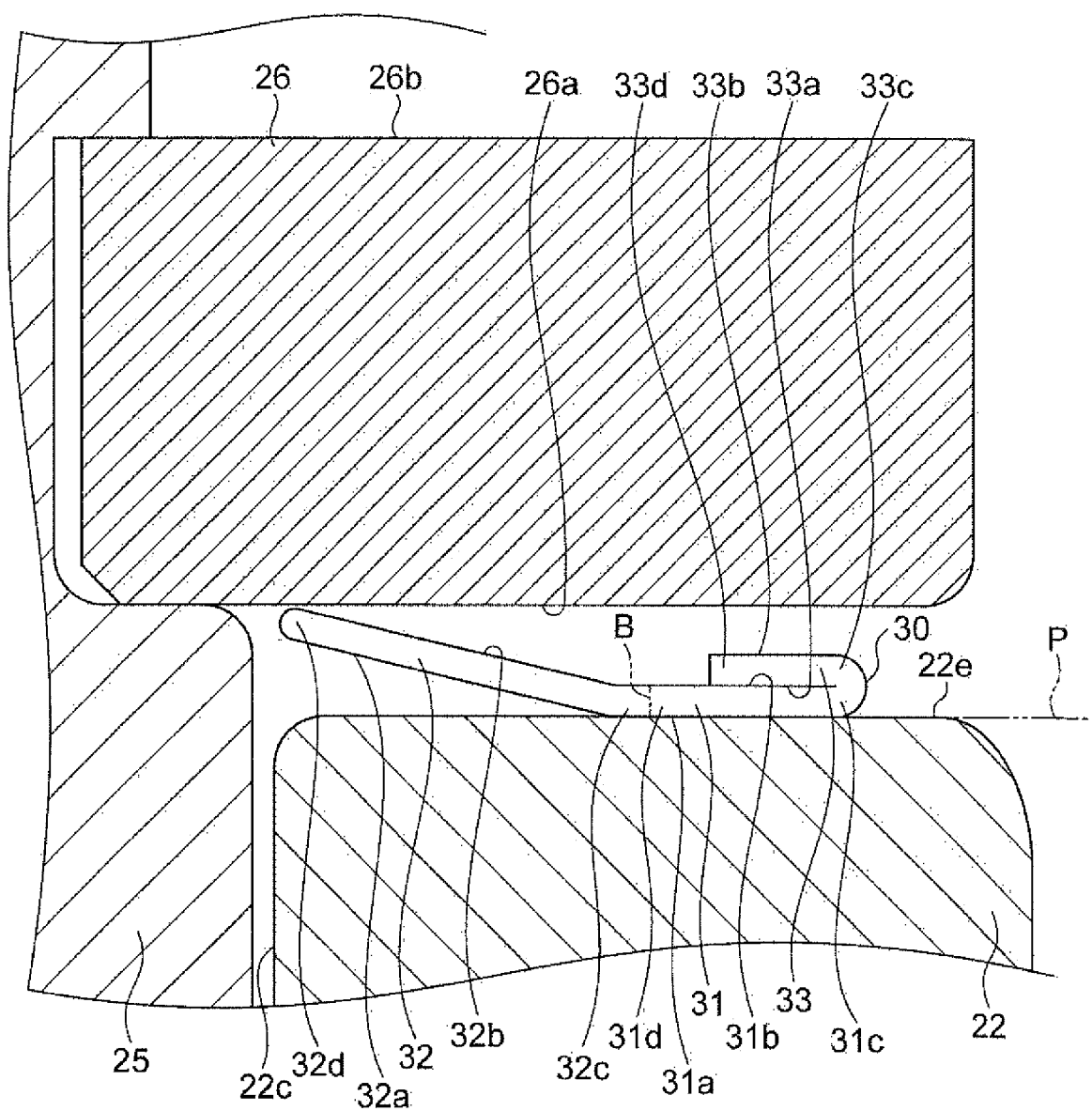
FIG. 8 is a partial enlarged view of another example variable flow rate valve mechanism including another example spring washer.

In some examples, the deformable portion 32 is connected to the outer end portion 31c of the support portion 31. However, the deformable portion 32 may be connected to the inner end portion 31d of the support portion 31. For example, as illustrated in FIG. 8, the support portion 31 and the deformable portion 32 may be integrally formed by connecting the inner end portion 31d of the support portion 31 to the outer end portion 32c of the deformable portion 32 to improve the reliability. In addition, since the valve 23 to which the lock plate 26 is fixed is capable of moving by a very small amount with respect to the inner end portion 32d of the deformable portion 32, which serves as a fulcrum, the range of the very small amount of movement of the valve 23 is increased. Accordingly, the valve 23 is capable of more reliably coming into close contact with the peripheral edge portion 17b of the opening portion 17a of the bypass passage 17. The protrusion portion 33 may be connected to the outer end portion 31c of the support portion 31. For example, the support portion 31 and the protrusion portion 33 are integrally formed by connecting the outer end portion 31c of the support portion 31 to the outer end portion 33c of the protrusion portion 33. The protrusion portion 33 is formed, for example, by bending a radial outer edge of the support portion 31 by 180° to improve the reliability with a simple configuration.

In some examples, the protrusion portion 33 is connected to the inner end portion 31d of the support portion 31. However, the protrusion portion 33 may be provided at a random position on the open surface 31b of the support portion 31. In addition, the protrusion portion 33 may be provided in the deformable portion 32 to protrude in a thickness direction of the deformable portion 32. The protrusion portion 33 may be formed, for example, by bending the outer end portion 32c (refer to FIG. 6) or the inner end portion 32d (refer to FIG. 8) of the deformable portion 32 by 180°. In some examples, a bending direction is random. In addition, the protrusion portion 33 may be provided at a random position on the first surface 32a or the second surface 32b of the deformable portion 32. In addition, the protrusion portions 33 may be formed in both of the support portion 31 and the deformable portion 32. As described above, the protrusion portion 33 may be provided in at least one of the support portion 31 and the deformable portion 32 to protrude in the thickness direction of the support portion 31 or the deformable portion 32.

In some examples, the spring washer 30 is disposed such that the seat surface 31a of the support portion 31 is in contact with the second attachment surface 22e of the valve attachment member 22 and the outer end portion 32c (refer to FIG. 6) or the inner end portion 32d (refer to FIG. 8) of the deformable portion 32 is in contact with the first lock surface 26a of the lock plate 26. However, the spring washer 30 may be disposed such that the seat surface 31a of the support portion 31 is in contact with the first lock surface 26a of the lock plate 26 and the outer end portion 32c (refer to FIG. 6) or the inner end portion 32d (refer to FIG. 8) of the deformable portion 32 is in contact with the second attachment surface 22e of the valve attachment member 22. The direction of disposition of the spring washer 30 may be random.

In some examples, the spring washer 30 is disposed between the valve attachment member 22 and the lock plate 26. However, the spring washer 30 may be disposed between the valve attachment member 22 and the valve body 24. As such, the spring washer 30 may be disposed between the valve attachment member 22 and the lock plate 26 or between the valve attachment member 22 and the valve body 24.

Figure 9:
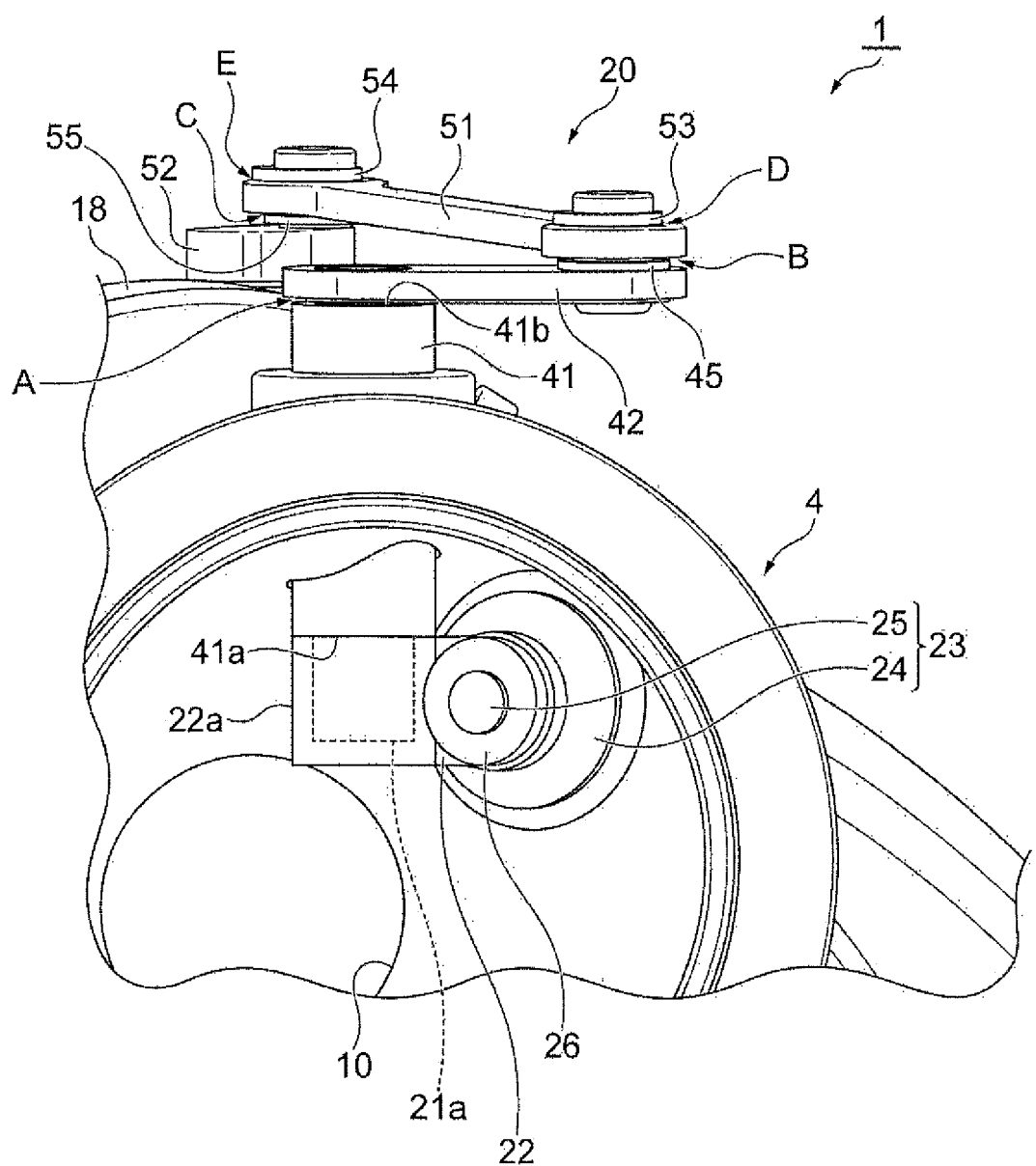
FIG. 9 is a perspective view of another example variable flow rate valve mechanism.

As illustrated in FIGS. 9 and 10, the spring washer 30 may be disposed between the second end face 41b of the bearing 41 and the link member 42 (indicated by A) to apply a repulsive force to the bearing 41 and the link member 42. The spring force of the spring washer 30 is capable of inhibiting collision between the bearing 41 and the link member 42. Accordingly, collision noise (striking noise) between the bearing 41 and the link member 42 in the wastegate valve 20 is reduced to reduce noise generated from the turbocharger 1 and to improve the reliability of the turbocharger 1.

The spring washer 30 may be disposed between the link member 42 and the operation rod 51 (indicated by B) to apply a repulsive force to the link member 42 and the operation rod 51. The spring force of the spring washer 30 is capable of inhibiting collision between the link member 42 and the operation rod 51. Accordingly, collision noise (striking noise) between the link member 42 and the operation rod 51 in the wastegate valve 20 is reduced to reduce noise generated from the turbocharger 1 and to improve the reliability of the turbocharger 1. FIGS. 9 and 10 illustrate an example variable flow rate valve mechanism where the link member 42 includes a link pin seat surface 45 protruding from a main body of the link member 42 and the spring washer 30 is disposed between the link pin seat surface 45 and the operation rod 51. However, the link member 42 may not include the link pin seat surface 45.

The spring washer 30 may be disposed between the operation rod 51 and the link member 52 (indicated by C) to apply a repulsive force to the operation rod 51 and the link member 52. The spring force of the spring washer 30 is capable of inhibiting collision between the operation rod 51 and the link member 52. Accordingly, collision noise (striking noise) between the operation rod 51 and the link member 52 in the wastegate valve 20 is reduced to reduce noise generated from the turbocharger 1 and to improve the reliability of the turbocharger 1. FIGS. 9 and 10 additionally illustrate the example variable flow rate valve mechanism where the link member 52 includes a link pin seat surface 55 protruding from a main body of the link member 52 and the spring washer 30 is disposed between the link pin seat surface 55 and the operation rod 51. However, the link member 52 may not include the link pin seat surface 55.

The spring washer 30 may be disposed between the operation rod 51 and a clip (lock member) 53 which couples the operation rod 51 and the link member 42 to each other (indicated by D), to apply a repulsive force to the operation rod 51 and the clip 53. The spring force of the spring washer 30 is capable of inhibiting collision between the operation rod 51 and the clip 53. Accordingly, collision noise (striking noise) between the operation rod 51 and the clip 53 in the wastegate valve 20 is reduced to reduce noise generated from the turbocharger 1 and to improve the reliability of the turbocharger 1.

The spring washer 30 may be disposed between the operation rod 51 and a clip (lock member) 54 which couples the operation rod 51 and the link member 52 to each other (indicated by E), to apply a repulsive force to the operation rod 51 and the clip 54. The spring force of the spring washer 30 is capable of inhibiting collision between the operation rod 51 and the clip 54. Accordingly, collision noise (striking noise) between the operation rod 51 and the clip 54 in the wastegate valve 20 is reduced to reduce noise generated from the turbocharger 1 and to improve the reliability of the turbocharger 1.

FIG. 10 illustrates example spring washers 30 disposed between the second end face 41b of the bearing 41 and the link member 42 (indicated by A), between the link member 42 and the operation rod 51 (indicated by B), and between the operation rod 51 and the link member 52 (indicated by C). However, in some examples, the spring washers 30 may be disposed in either one portion or a plurality of portions between the second end face 41b of the bearing 41 and the link member 42 (indicated by A), between the link member 42 and the operation rod 51 (indicated by B), between the operation rod 51 and the link member 52 (indicated by C), between the operation rod 51 and the clip 53 (indicated by D), and between the operation rod 51 and the clip 54 (indicated by E). The positioning of the example spring washer 30 may be configured to reduce noise generated from the turbocharger 1 and to improve the reliability of the turbocharger 1.

In some examples, the spring washer 30 is a quarter-bead type. However, the spring washer 30 may be, for example, a half-bead type. The spring washer 30 may further include a support portion that is connected to the outer end portion 32c (refer to FIG. 6) of the deformable portion 32 or the inner end portion 32d (refer to FIG. 8) of the deformable portion 32 and includes a seat surface along a surface parallel to the plane P.

In some examples, the protrusion portion 90 is connected to the inner end portion of the first support portion 71. However, the protrusion portion 90 may be connected to an outer end portion of the first support portion 71. The protrusion portion 90 may be formed, for example, by bending an outer edge of the first support portion 71 by 180°. In addition, the protrusion portion 90 may be provided at a random position on the first open surface 71b of the first support portion 71. In addition, the protrusion portion 90 may be provided in the deformable portion 80 to protrude in a thickness direction of the deformable portion 80. The protrusion portion 90 may be formed, for example, by bending an outer end portion or an inner end portion of the inclined portion 81 by 180°. In some examples, a bending direction is random. In addition, the protrusion portion 90 may be provided at a random position on one surface or the other surface of the inclined portion 81. In addition, the protrusion portions 90 may be formed in both of the support portion 70 and the deformable portion 80. As described above, the protrusion portion 90 may be provided in at least one of the support portion 70 and the deformable portion 80 to protrude in the thickness direction of the support portion 70 or the deformable portion 80.

In some examples, the spring washer 60 is disposed such that the first seat surface 71a of the first support portion 71 is in contact with the second attachment surface 22e of the valve attachment member 22 and the second seat surface 72a of the second support portion is in contact with the first lock surface 26a of the lock plate 26. However, in other examples, the spring washer 60 may be disposed such that the first seat surface 71a of the first support portion 71 is in contact with the first lock surface 26a of the lock plate 26 and the second seat surface 72a of the second support portion is in contact with the second attachment surface 22e of the valve attachment member 22. Additionally, the direction of disposition of the spring washer 60 may be random.

In some examples, the spring washer 60 is disposed between the valve attachment member 22 and the lock plate 26. However, the spring washer 60 may be disposed between the valve attachment member 22 and the valve body 24. For example, the spring washer 60 may be disposed between the valve attachment member 22 and the lock plate 26 or between the valve attachment member 22 and the valve body 24.

The spring washer 60 may be disposed between the second end face 41b of the bearing 41 and the link member 42 to apply a repulsive force to the bearing 41 and the link member 42. The spring force of the spring washer 60 is capable of inhibiting collision between the bearing 41 and the link member 42. Accordingly, collision noise (striking noise) between the bearing 41 and the link member 42 in the wastegate valve 20 is reduced to reduce noise generated from the turbocharger 1 and to improve the reliability of the turbocharger 1.

The spring washer 60 may be disposed between the link member 42 and the operation rod 51 to apply a repulsive force to the link member 42 and the operation rod 51. The spring force of the spring washer 60 is capable of inhibiting collision between the link member 42 and the operation rod 51. Accordingly, collision noise (striking noise) between the link member 42 and the operation rod 51 in the wastegate valve 20 is reduced to reduce noise generated from the turbocharger land to improve the reliability of the turbocharger 1.

The spring washer 60 may be disposed between the operation rod 51 and the link member 52 to apply a repulsive force to the operation rod 51 and the link member 52. The spring force of the spring washer 60 is capable of inhibiting collision between the operation rod 51 and the link member 52. Accordingly, collision noise (striking noise) between the operation rod 51 and the link member 52 in the wastegate valve 20 is reduced to reduce noise generated from the turbocharger 1 and to improve the reliability of the turbocharger 1.

The spring washer 60 may be disposed between the operation rod 51 and the clip 53 to apply a repulsive force to the operation rod 51 and the clip 53. The spring force of the spring washer 60 is capable of inhibiting collision between the operation rod 51 and the clip 53. Accordingly, collision noise (striking noise) between the operation rod 51 and the clip 53 in the wastegate valve 20 is reduced to reduce noise generated from the turbocharger land to improve the reliability of the turbocharger 1.

The spring washer 60 may be disposed between the operation rod 51 and the clip 54 to apply a repulsive force to the operation rod 51 and the clip 54. The spring force of the spring washer 30 is capable of inhibiting collision between the operation rod 51 and the clip 54. Accordingly, collision noise (striking noise) between the operation rod 51 and the clip 54 in the wastegate valve 20 is reduced to reduce noise generated from the turbocharger land to improve the reliability of the turbocharger 1.

The spring washers 60 may be provided in either one portion or a plurality of portions between the second end face 41b of the bearing 41 and the link member 42, between the link member 42 and the operation rod 51, between the operation rod 51 and the link member 52, between the operation rod 51 and the clip 53, and between the operation rod 51 and the clip 54. The positioning of the spring washer 60 may be configured to reduce noise generated from the turbocharger 1 and to improve the reliability of the turbocharger 1.

We claim:

1. A variable flow rate valve mechanism comprising:
a valve including a valve body and a valve shaft protruding from the valve body;
a lock member fixed to the valve shaft;
a valve attachment member attached to the valve shaft between the valve body and the lock member to hold the valve together with the lock member; and
a spring washer formed into an annular shape around an axis of the spring washer and disposed adjacent to the valve attachment member,
wherein the spring washer includes:
a support portion including a seat surface formed along a plane perpendicular to the axis of the spring washer and an open surface provided opposite to the seat surface;
a deformable portion connected to the support portion and extending in an inclined manner with respect to the plane, the deformable portion including a contact surface formed to be continuous with the open surface of the support portion; and
a protrusion portion extending over the open surface of the support portion in a radial direction of the spring washer to limit a deformation of the deformable portion in an axial direction of the spring washer during actuation of the spring washer, wherein the support portion is at least 20% wider than the protrusion portion in the radial direction, to avoid contact of the protrusion portion with deformable portion during the actuation of the spring washer,
wherein the support portion is formed into an annular shape around the axis of the spring washer,
wherein the deformable portion is connected to a radial inner end portion of the support portion, and
wherein the protrusion portion is provided on the open surface of the support portion at a radial outer edge of the support portion.

2. The variable flow rate valve mechanism according to claim 1,
wherein the protrusion portion is formed by bending the radial outer edge of the support portion.

3. The variable flow rate valve mechanism according to claim 1,
wherein the spring washer is disposed between the valve attachment member and the lock member.

4. The variable flow rate valve mechanism according to claim 1,
wherein the spring washer is disposed between the valve attachment member and the valve body.

5. The variable flow rate valve mechanism according to claim 1,
wherein the support portion of the spring washer includes:
a plurality of first support portions each including a first seat surface formed along a first plane perpendicular to the axis of the spring washer and a first open surface opposite to the first seat surface; and
a plurality of second support portions each including a second seat surface formed along a second plane perpendicular to the axis of the spring washer, the second plane being spaced apart from the first plane in a direction along the axis of the spring washer, and a second open surface opposite to the second seat surface,
wherein the first support portions and the second support portions are spaced apart from each other in a circumferential direction of the spring washer and are alternately disposed in the circumferential direction,
wherein the deformable portion includes a plurality of inclined portions each connected to a circumferential end portion of the first support portion and a circumferential end portion of the second support portion to extend in an inclined manner with respect to the first plane and the second plane, and
wherein the protrusion portion is provided on at least one of the first open surface of the first support portion and the second open surface of the second support portion.

6. A turbocharger comprising the variable flow rate valve mechanism according to claim 1.

7. A variable flow rate valve mechanism comprising:
a valve including a valve body and a valve shaft protruding from the valve body;
a lock member fixed to the valve shaft;
a valve attachment member attached to the valve shaft between the valve body and the lock member to hold the valve together with the lock member; and a spring washer formed into an annular shape around an axis of the spring washer and disposed adjacent to the valve attachment member, the spring washer comprising:
- a support portion including a seat surface formed along a plane perpendicular to the axis of the spring washer and an open surface provided opposite to the seat surface;
- a deformable portion connected to the support portion, wherein the deformable portion extends in an inclined manner with respect to the plane from a bending point of the spring washer, and wherein the deformable portion includes a contact surface formed to be continuous with the open surface of the support portion; and
- a protrusion portion extending over the open surface of the support portion in a radial direction of the spring washer to limit a deformation of the deformable portion in an axial direction of the spring washer during actuation of the spring washer, wherein the support portion is at least 20% wider than the protrusion portion in the radial direction so as to space away the protruding portion from the bending point of the spring washer, in the radial direction.

8. The variable flow rate valve mechanism according to claim 7,
wherein the support portion is formed into an annular shape around the axis of the spring washer,
wherein the deformable portion is connected to a radial end portion of the support portion,
wherein the protrusion portion is provided on the open surface of the support portion, and
wherein the protrusion portion is formed by bending a radial edge of the support portion.

9. The variable flow rate valve mechanism according to claim 8,
wherein the protrusion portion includes a surface formed to be continuous with the open surface of the support portion, and
wherein the surface of the protrusion portion contacts the open surface of the support portion.

10. The variable flow rate valve mechanism according to claim 8,
wherein the protrusion portion is formed into an annular shape around the axis of the spring washer.

11. The variable flow rate valve mechanism according to claim 7,
wherein the protruding portion is positioned to avoid contact with the deformable portion during the actuation of the spring washer.

12. The variable flow rate valve mechanism according to claim 7,
wherein the support portion is formed into an annular shape around the axis of the spring washer,
wherein the deformable portion is connected to a radial outer end portion of the support portion, and
wherein the protrusion portion is provided on the open surface of the support portion.

13. The variable flow rate valve mechanism according to claim 7,
wherein the support portion is formed into an annular shape around the axis of the spring washer,
wherein the deformable portion is connected to a radial inner end portion of the support portion, and
wherein the protrusion portion is provided on the open surface of the support portion at a radial outer edge of the support portion.

14. The variable flow rate valve mechanism according to claim 13,
wherein the protrusion portion is formed by bending the radial outer edge of the support portion.

15. A variable flow rate valve mechanism comprising:
a valve;
a stem having a first end and a second end, the first end being coupled to the valve;
a bearing that has a tubular shape and rotatably supports the stem;
a link member coupled to the second end of the stem, the second end of the stem protruding from an end face of the bearing; and
a spring washer, formed into an annular shape, the spring washer comprising:
- a support portion including a seat surface formed along a plane perpendicular to an axis of the spring washer and an open surface provided opposite to the seat surface;
- a deformable portion connected to the support portion, wherein the deformable portion extends in an inclined manner with respect to the plane from a bending point of the spring washer, and wherein the deformable portion includes a contact surface formed to be continuous with the open surface of the support portion; and
- a protrusion portion extending over the open surface of the support portion in a radial direction of the spring washer to limit a deformation of the deformable portion in an axial direction of the spring washer during actuation of the spring washer, wherein the support portion is at least 20% wider than the protrusion portion in the radial direction so as to space away the protruding portion from the bending point of the spring washer, in the radial direction,
wherein the spring washer is disposed closer to the link member than to the valve.

16. The variable flow rate valve mechanism according to claim 15,
wherein the link member has a base end portion and a tip portion, the base end portion being coupled to the second end of the stem,
wherein the variable flow rate valve mechanism further comprises an operation rod coupled to the tip portion of the link member, and
wherein the spring washer is disposed adjacent the tip portion of the link member.

17. The variable flow rate valve mechanism according to claim 16,
wherein the spring washer is disposed between the link member and the operation rod.

18. The variable flow rate valve mechanism according to claim 15,
wherein the link member is a first link member having a base end portion and a tip portion, the base end portion being coupled to the second end of the stem,
wherein the variable flow rate valve mechanism further comprises:
an operation rod having a base end portion and a tip portion, the tip portion of the operation rod being coupled to the tip portion of the first link member; and
a second link member coupled to the base end portion of the operation rod, and
wherein the spring washer is disposed adjacent the base end portion of the operation rod.

19. The variable flow rate valve mechanism according to claim 18,
wherein the spring washer is disposed between the operation rod and the second link member.

20. The variable flow rate valve mechanism according to claim 15, wherein the spring washer is disposed between the end face of the bearing and the link member.

\* \* \* \* \*